United States Patent [19]

McGowan et al.

[11] Patent Number: 4,641,288

[45] Date of Patent: Feb. 3, 1987

[54] RIBBON TERMINATION MEMBER

[75] Inventors: George A. McGowan, Westminster; Robert L. Kaplan, San Diego, both of Calif.

[73] Assignee: Hughes Aircraft Company, Los Angeles, Calif.

[21] Appl. No.: 796,050

[22] Filed: Nov. 7, 1985

[51] Int. Cl.[4] .............................................. G01V 1/38
[52] U.S. Cl. ..................................... 367/20; 367/154; 367/191; 174/101.5
[58] Field of Search ................. 367/191, 15, 154, 106, 367/20, 131, 177, 130, 165, 173, 163; 181/110; 174/101.5

[56] References Cited

U.S. PATENT DOCUMENTS 3,319,734  5/1967  Pavey ................................... 367/154
4,180,103 12/1979  Mollere ........................... 367/106 X

FOREIGN PATENT DOCUMENTS 769467  7/1980  U.S.S.R. .

Primary Examiner—Charles T. Jordan
Assistant Examiner—John W. Eldred
Attorney, Agent, or Firm—T. A. Runk; A. W. Karambelas

[57] ABSTRACT

Ribbon termination member has thread therein for connection to a coupling between sections of the towed array. First and second pins have cylindrically curved front surfaces upon which legs of the flexible ribbon tension member are engaged. The curved surfaces permit transfer of tension loads between the flexible tension ribbon and the pins. The second pin has an extended bearing surface 92 for preventing damage to the ribbon when loads are out-of-line.

14 Claims, 9 Drawing Figures

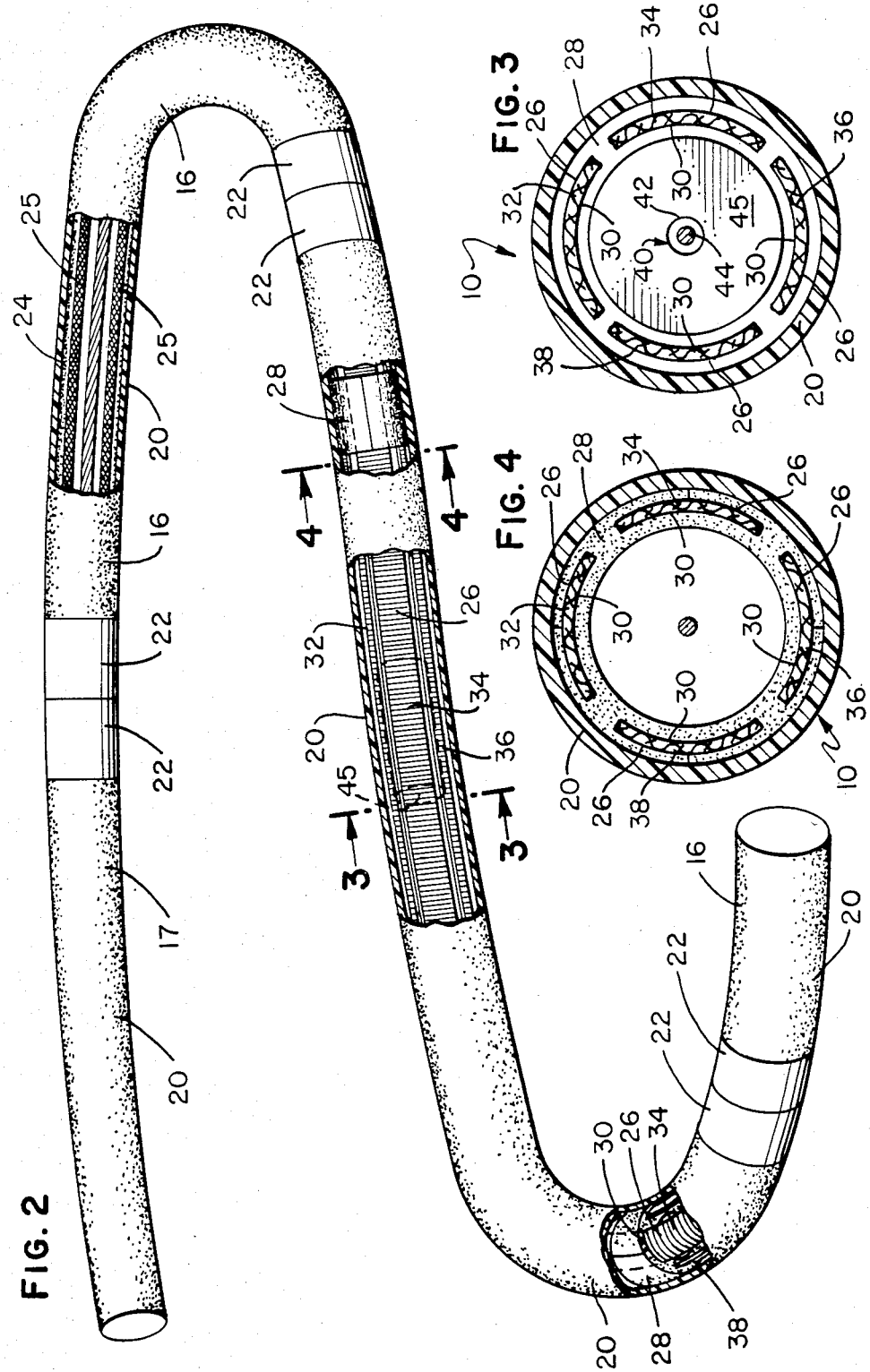

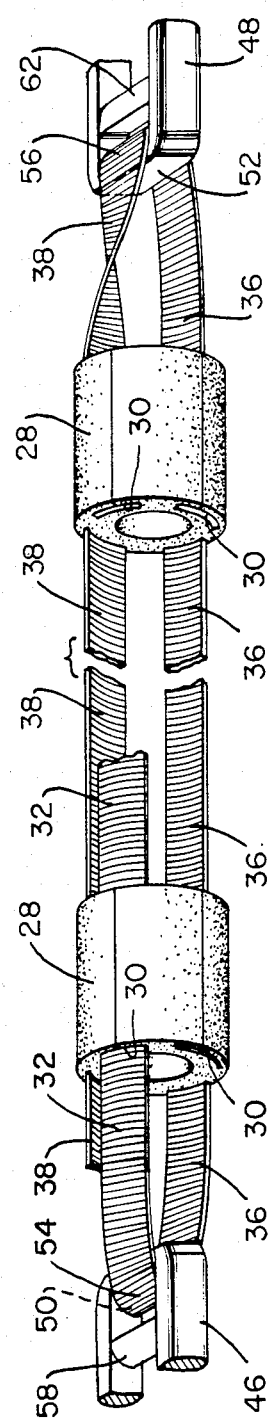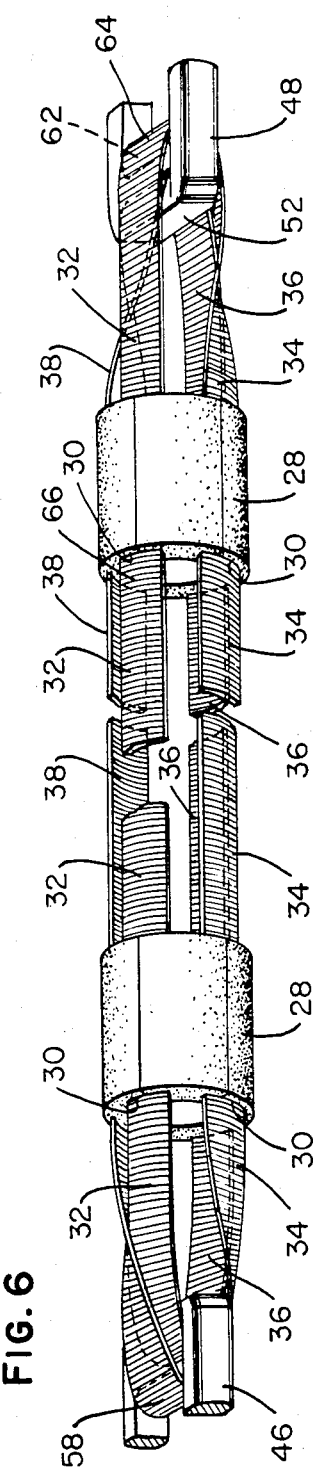

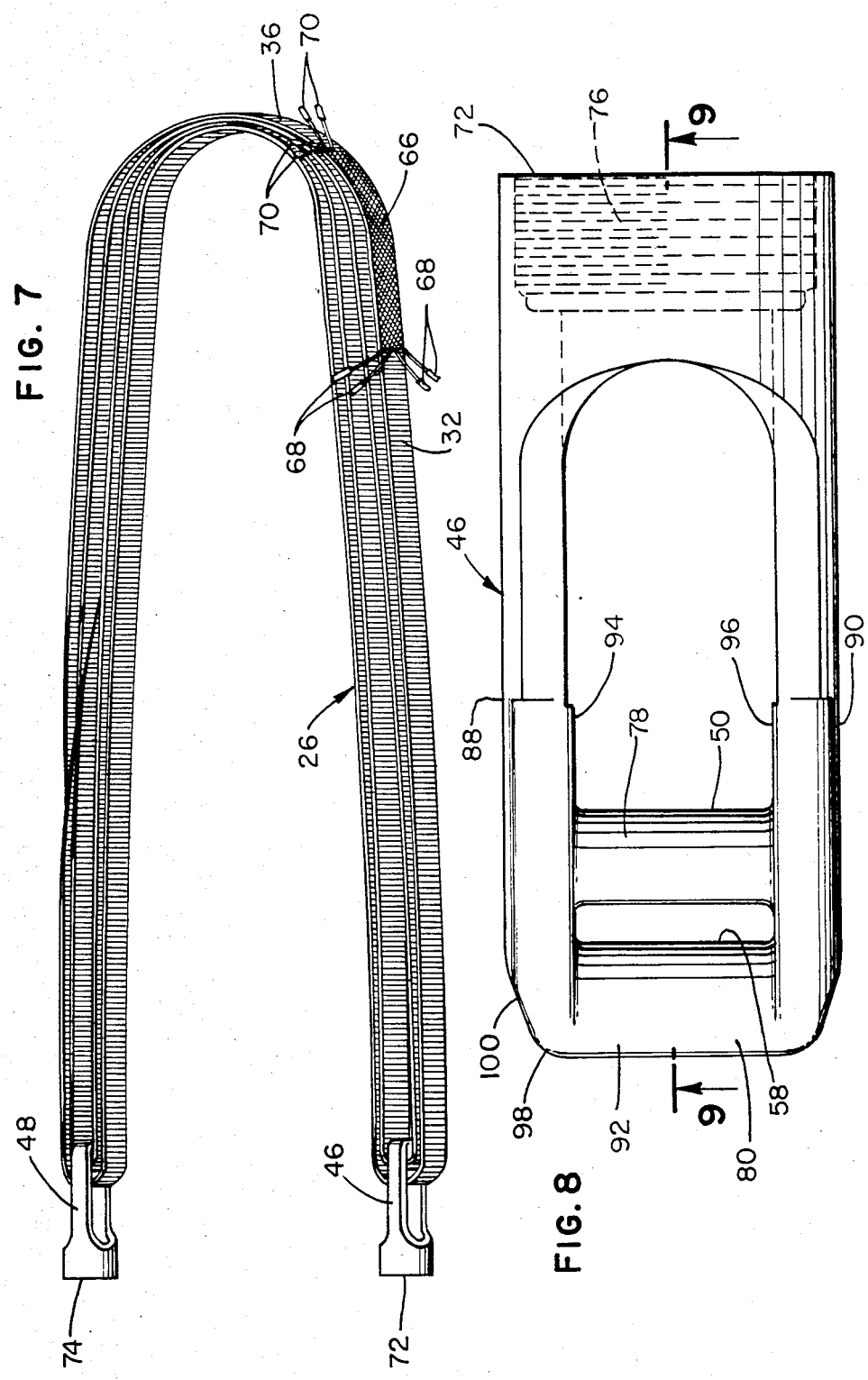

RIBBON TERMINATION MEMBER

The Government has rights in this invention pursuant to Contract No. N00024-80-C-6347 awarded by the Department of the Navy.

BACKGROUND OF THE INVENTION

This invention relates to a sonar towed array and, more particularly, to a ribbon termination member for a high-strength, thin-line towed sonar array.

Generally, sonar arrays are towed up to a mile or so behind the towing vessel. The towed array is deployed by unwinding it from the spool of a winch, on which it is stowed when not in use. The array may be on the order of 1500 feet in length and one inch in diameter, and is generally made in sections or modules of about 90 feet in length, which are joined together by means of an electro-mechanical coupling. An internal strength member runs the length of each module, and functions to carry the tensile load on each module, mainly caused by drag of the array as it is towed.

Some modules are acoustic modules, and contain sensitive acoustic sensors. In order to provide space for the sensors and to prevent unwanted acoustic signals from being passed to these sensors, a flat or ribbon-type strength member is employed in the acoustic modules. This ribbon-type strength member is arranged inside the walls of the tubular jacket of the module so that it does not have mechanical contact with the sensors, to minimize the transfer of unwanted acoustic signals.

Other modules, called vibration isolation modules, function to mechanically isolate the acoustic-type modules from vibrations of the towing vessel. This results in reducing the transfer of unwanted acoustic signals to the acoustic sensors contained in the acoustic modules.

The vibration isolation module contains no acoustic sensors and therefore can use a more economical braided rope type or round strength member, rather than the lower-profile flat, ribbon-type strength member which provides space for the sensors.

The maximum length of an electro-mechanical coupling, and therefore the maximum length of a strength termination member, is limited in order to prevent damage to the array which may occur during winching by wrapping the rigid straight coupling around the curved winch drum. The maximum diameter of a strength termination member is also limited because it must fit inside the electro-mechanical coupling, which itself must carry the entire load of the array. In the preferred embodiment and in present practice, the array is limited to a maximum diameter of 1 inch.

The strength termination member must provide space for containing a multi-pin potted electrical connector and allow for passage of coaxial cables.

The strength termination member must also ensure the integrity of the strength member during and after repeated deployment and retrieval winching operations.

Kevlar aramid fiber material, a synthetic material produced by E. I. DuPont de Nemours & Co., is frequently used as the strength member in military and commercial towed sonar and sounding arrays. See U.S. Pat. No. 4,160,229 to McGough, and U.S. Pat. No. 4,090,168 to Miller, et al. Kevlar fiber material is an aramid, which is the generic name for a distinctive class of aromatic polyamide fibers. Kevlar aramid fiber material has an extremely high tensile strength, and greater resistance to elongation than steel. Its high energy-absorption property makes it particularly suitable for use as belting in radial tires and as a reinforcing material for polymer composites.

Although Kevlar aramid fiber material is very strong in tension, it is subject to damage by being compressed, kinked, cut or bent around a tight radius. Such damage weakens the Kevlar aramid fiber material, leading to early failure when used as a strength member in a towed sonar array. This is particularly the case when the "wedge-cone" type of termination is employed on a Kevlar aramid fiber material strength member in a towed array. In the "wedge-cone" termination, the ends of several Kevlar aramid fiber material ribbons are inserted in a conical opening in a metal termination, and a metal cone is driven into the opening to wedge the Kevlar aramid fiber material therein, by pinching the ribbons against the side of the opening.

Uneven lengths of the Kevlar aramid fiber material strength member ribbons, common with this type of termination, cause one of the ribbons to take a disproportionately greater percentage of the load, resulting in early failure. Also, during winching operations where the pull is not straight, the Kevlar aramid fiber material ribbons may be bent and pulled taut over a sharp edge or a tight radius, causing damage to the Kevlar strength member.

SUMMARY OF THE INVENTION

In order to aid in the understanding of this invention, it can be stated in essentially summary form that it is directed to a strength termination member having two smooth surfaces which are, in effect, large diameter pins. A continuous loop of a ribbon-type Kevlar aramid fiber material strength member is terminated by wrapping it around the two smooth, large diameter pin-surfaces of each of two such terminations. The two separate pin-surfaces on each termination, combined with the single continuous loop design, ensure equal loading in each of four legs of the strength member. The termination member of the present invention provides smooth surfaces to the strength member in all directions which come into play during winching operations.

Accordingly, it is a purpose and advantage of this invention to provide a strength termination member for a towed array to transfer the tensile load of the strength member to the electro-mechanical coupling at each end of a module. The tensile load of each module is thus successively transferred to the next forward module, until the entire load of the array is passed through the forward-most strength member termination and electro-mechanical coupling to the towing vessel.

It is another purpose and advantage of the present invention to provide a strength termination member which presents solely smooth surfaces to the strength member in all directions.

Another purpose and advantage of the invention is to provide a ribbon strength termination member which presents only large radius curved surfaces to the ribbon strength member.

A further purpose and advantage of the present invention is the provision of a termination member for a continuous loop strength member, which results in equal loading of the legs of the loop.

The foregoing and other purposes and advantages of the present invention may be more readily understood with reference to the following detailed description taken in conjunction with the accompanying drawings.

BRIEF DESCRIPTION OF THE DRAWINGS

FIG. 2 is an illustration in perspective of a length of the sonar towed array assembly of FIG. 1, partly broken away to show the ribbon strength member in the interior thereof.

FIG. 3 is a cross-sectional view of the length of towed array shown in FIG. 2, taken along the lines 3—3.

FIG. 4 is another cross-section of the sonar array assembly of FIG. 2, taken along the lines 4—4.

FIG. 5 illustrates a step in threading the continuous loop ribbon strength member of FIGS. 2, 3 and 4 through two spacers, and through the end terminations of the towed array assembly.

FIG. 6 illustrates all four legs of the continuous loop strength member threaded through the spacer and the two end terminations of FIG. 5.

FIG. 7 is a perspective view of the continuous loop strength member of FIGS. 5 and 6 threaded through the four pin-surfaces of the two terminations, showing the splice, but without the spacers usually used to hold the four legs of the loop equally spaced close to the inside jacket wall.

FIG. 8 is a plan view of one of the terminations of FIG. 7 drawn to a larger scale.

DESCRIPTION OF THE PREFERRED EMBODIMENT

Figure 1:
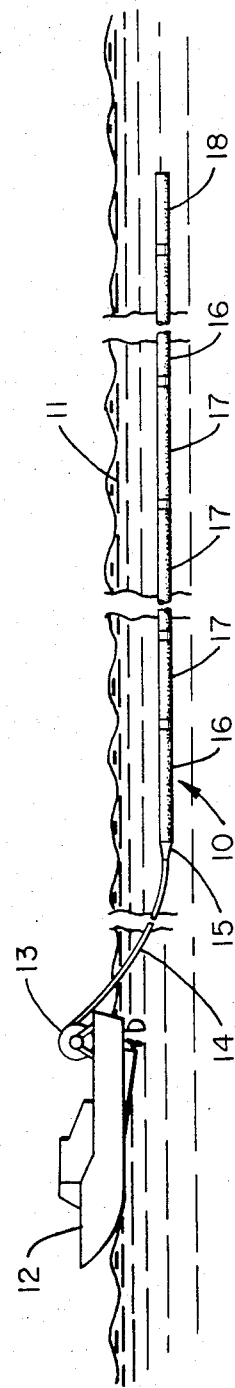
FIG. 1 is a pictorial view of a sonar array assembly being towed through the water by a towboat.

Referring to FIG. 1 of the drawings, a sonar towed array assembly 10 is in operating position under the surface of a body of water 11 in tow behind a marine vessel 12. During tests, the vessel 12 may be a surface vessel, as shown, but during operations, the vessel 12 may be a submarine. The vessel 12 is equipped with a winch 13 having a spool on which the sonar towed array assembly 10 can be stowed, when desired. The sonar towed array assembly 10 comprises a cable 14, which includes electrical signal conductors and a strength member such as a steel towing cable. The cable 14 may be attached to a nose cone 15 which is followed by vibration isolation module 16 and acoustic modules 17. The sonar towed array assembly 10 terminates in a drogue 18.

As shown in FIG. 2, each of the sonar array modules 16, 17 comprises an elongated hollow jacket 20 formed of a flexible material having suitable strength, abrasion resistance, acoustic, viscoelastic and chemical resistance properties. Polyvinylchloride has been used for the jacket 20 on the acoustic modules 17, and polyurethane has been found satisfactory for the vibration isolation modules 16.

This outer jacket 20 resembles a hose, and in the embodiment is about one inch in diameter. Individual modules 16, 17 are usually about 90 feet in length, and are joined together by electro-mechanical couplings 22. The space enclosed by the jacket 20 is filled with a liquid filler 24 such as Exxon Isopar-L, or the like, which is slightly pressurized to maintain the shape of the array modules 16 and 17. The purpose of the liquid filler 24 is to replace the compressible air with an incompressible liquid. The liquid filler 24 must be an electrical insulator, and must have certain other desirable physical characteristics, such as those provided by Exxon Isopar-L.

In FIG. 2 it may be seen that the invention isolation module 16 contains round, rope-like strength members 25, whereas the acoustic module 17 contains a flat ribbon-type strength member 26.

FIG. 3 is a cross-sectional drawing of the acoustic module 17 of the sonar array assembly 10 shown in FIG. 2. Many different elements are distributed along the length of the array assembly 10. The hydrophones (not shown) are each encased in its own plastic tube with its own fluid. Besides the hydrophones, there are other electronic components for telemetry and power such as canister 45 and electrical cables, including coaxial cables. There is preferably a hard spacer inside the array assembly 10. In FIG. 3 it may be seen that the flat, ribbon strength member 26 passes within the inner wall jacket 20 and outside of canister 45 without being in mechanical contact with the canister 45. As shown in FIGS. 4, 5 and 6 this is due to the flat ribbon strength member 26 being threaded through rubber spacers 28.

Each rubber spacer 28 is a tubular right circular cylinder in shape, and serves to space the ribbon strength member 26 away from the canister 45, hydrophones (not shown), and maintain the internal configuration. If the cavity is foam-filled, the spacer helps maintain the foam in place. The rubber spacer 28 has four slots 30 along the sides to hold the four legs 32,34,36,38 of the ribbon strength member 26 in an orthogonal relationship. Each slot is curved to be concentric with the jacket and array center-lines.

In FIG. 3, a coaxial cable 40, having an outer conductor 42 and an inner conductor 44, may be seen in the center of the sonar array assembly 10. Also, the cylindrical canister 45, containing electronics, may be seen inside the four legs 32,34,36,38 of the strength member 26. This is to show how the flat strength member 26 is arranged in curves around the jacket wall so as not to have mechanical contact with the electronic elements, such as the hydrophones or amplifiers.

As was pointed out, the ribbon strength member is preferably made of Kevlar, a synthetic aramid material produced by E.I. DuPont de Nemours & Co. This material approaches steel in strength and in elasticity, and is light in weight. However, it may be damaged by being compressed, kinked, cut or bent around a tight radius. Thus, the problem is to transfer the stress in the Kevlar aramid fiber material ribbon strength member to a mechanical termination member without subjecting it to any such damaging conditions.

Referring now to FIG. 5, there is shown a partially assembled continuous loop strength member 26 extending between, and threaded through, two termination members 46 and 48. Two rubber spacers 28 are shown separating the legs of the strength member 26, and holding them in a curved shape in an orthogonal relationship. It will be understood that FIG. 5 is an example only, and that in actual use, the two termination members 46 and 48 would be threaded through many rubber spacers 28.

The termination member 46 at the left will be referred to as the aft termination member 46, and the termination member 48 on the right as the forward termination member 48. The aft termination member 46 has an inner curved pin surface 50, and the forward termination member 48 has an identical inner curved pin surface 52.

Beginning at the upper left in FIG. 5, the first leg 32 of the strength member 26 is threaded through a groove 30 in the spacer 28 and around the inner pin surface 50 of the aft termination member 46 to form an aft inner loop 54. It becomes 3rd leg 36, extending below and parallel to the 1st leg 32. The 3rd leg 36 passes through grooves 30 in the two rubber spacers 28 and extends to the forward termination member 48 to form the forward inner loop 56.

Upon emerging from the inner pin surface 52 of the forward termination member 48 it becomes the 4th leg 38 of the strength member 26, and it is rotated 90 degrees to be orthogonal to the 1st and 3rd legs 32,36.

Referring to FIG. 6, the 4th leg 38 threads through grooves 30 in the spacers 28 and approaches the aft termination 46 from above. It proceeds down and around an outer curved pin surface 58 in the aft termination member 46 to form an aft outer loop 60. It leaves the aft termination member 46 as 2nd leg 34, and makes a 90 degree twist to thread through the spacers 28, on the opposite side from, and parallel to 4th leg 38. The 2nd leg 34 approaches the forward termination member 48 from below and threads upward and around a curved outer pin surface 62 in the forward termination member 48 to form a forward outer loop 64.

As the ribbon emerges from the outer pin surface 62 of the forward termination member 48, it is above, and parallel to, the 3rd leg 36 of the strength member 26, and is joined to the 1st leg 32 by means of a splice 66.

In FIG. 7 there may be seen the flat, ribbon strength member 26, threaded through the two termination members 46,48 showing more clearly how the ends of the strength member 26 are joined together by the splice 66. The ends of individual bundles 68 of fibers from first leg 32, and the bundles 70 of fibers from third leg 36 may be seen protruding from the splice 66. Thus, the strength member 26 is a continuous piece which forms two loops because it is looped twice through the end terminations 46 and 48 to form a double loop having four legs 32, 34, 36 and 38.

For clarity, the strength member 26 is shown in FIG. 7 without the other elements of the array assembly 10, such as spacers 28 and the outer jacket 20. Also, the four legs 32, 34, 36 and 38 are not shown arranged in an orthogonal relationship in this figure, as they normally would be when under tension, and spaced apart by the spacers 28.

FIG. 7 also provides an understanding of the space available in the cylindrical interior 72 and 74 of the termination members 46 and 48 for the accommodation of electrical connectors and cables (not shown), which are normally present when the array assembly 20 is in operation.

Figure 9:
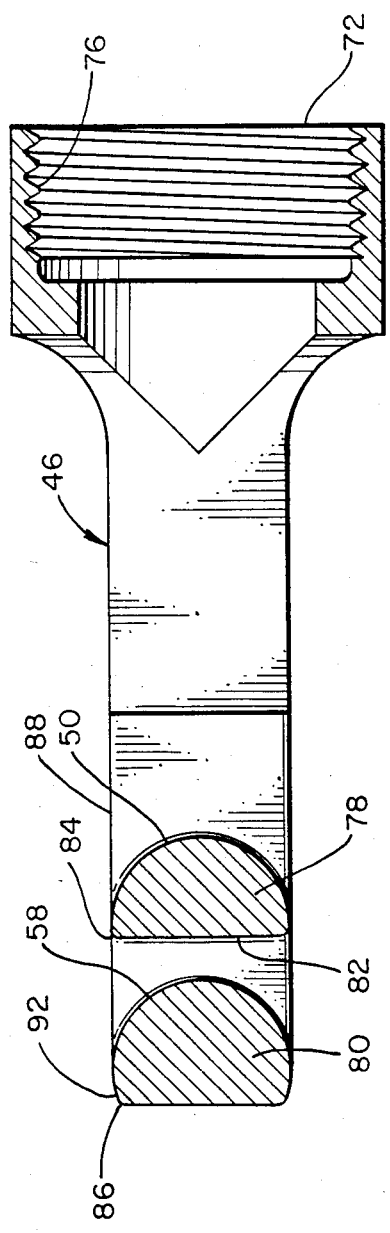
FIG. 9 is a cross-section of the termination of FIG. 8, taken along the lines 9—9.

FIGS. 8 and 9, show the critical mechanical details of the aft termination member 46 (which is identical to the forward termination member 48). These figures are drawn to an enlarged scale, and FIG. 8 shows a plan view, and FIG. 9 a central cross-section. The termination member 46 is made of a metal such as titanium, and the cylindrical interior 72 is provided with threads 76 for joining to the electrical-mechanical couplings 22 of the modules 16 and 17 of the array assembly 10. The surfaces 50, 58 are made to present an effective pin diameter on the order of ½ inch to the strength member 26.

The mechanical tensile strength of the multiple legs of the ribbon strength member can be made adequate to carry a desired load. Similarly, the mechanical strength of the termination member 46 shown in FIGS. 8 and 9 can also be designed to the desired load limit. The interface between the termination member and the strength member is critical. It is at the interface that most flexible strength members fail. FIGS. 8 and 9 show cross pins 78 and 80 which respectively carry the bearing surfaces 58 and 50 on which the strength member bears. These cross pins have the same radius. The surface 58 is a half of a right circular cylinder with a back surface 82 only slightly left to the cylindrical axis as is seen in FIG. 9. When the diameter of surface 58 is 0.400 inches, then the thickness of 78 in the left to right direction of load is only 0.230 inches. This is just enough to place a 0.30 radius at the back corners, the upper one of which is indicated at 84. However, the left pin 80 is 0.280 inches in left to right thickness. With a 0.400 diameter of bearing surface 50, this means that 0.80 inches of material extends to the left of the cylindrical center of curvature. This means that the cylindrical surface 50 extends 0.050 inches to the left of the axis and leaves 0.30 on the back corner 86 for radiusing. It is important that the radius of curvature of the bearing surfaces 50 and 58 be related to the thickness of the Kevlar aramid fiber material strength member. The radius of these surfaces is preferably at least 25 times the thickness of the Kevlar strength member. Limiting of the radius of curvature limits the difference in stress between fibers on the inner and outer surfaces of the ribbon. FIG. 8 shows side legs 88 and 90 which carry the cross pins 78 and 80. The side legs extend up to the socket which carries threads 76. The interior spacing between the side legs, that is the length of the cross pins, is as wide as the width of the strength member 26. The outer surfaces of the legs are cylindrical along the axis of the socket and threads in order that the termination member can fit inside the jacket. The pins are radiused into the interior surfaces of the side legs with a radius of 0.30, in the preferred example. It is important that the extended bearing surface 92 extend laterally outward, in the up and down direction FIG. 8, as far as possible and beyond the inner wall surfaces 94 and 96 of the legs 88 and 90. The extended bearing surface 92, which is to the left of the cylindrical axis of pin 80, extends laterally outward beyond the line of the inner wall. The extended surface 92 bears into radius 98 which is quite large, 0.100 in the preferred example. Radius 98 fairs into radius 100 of even larger radius, which completes the transition to the longitudinally cylindrical outer surfaces of the side legs. In this way, when the ribbon strength member 26 is not pulling straight out on the axis, it is still favored by general radia. The extended bearing surface 92 permits a full strength pull, without pulling the ribbon strength member around a sharp corner.

It should be clear that the ribbon strength member 26 is made of one continuous loop, and that the ends of the strength member 26 are spliced together to form a continuous loop after it has been threaded through the spacers 28, termination members 46 and 48 and hollow jacket 20. When the strength member 26 is under tension, the legs 32, 34, 36, and 38 adjust in length by slipping over the pin surfaces 50, 52, 58, and 62 until the legs 32, 34, 36, and 38 all carry the same load.

It should be noted that the ribbon strength member 26 is not subjected to being compressed, kinked, cut or bent around a tight radius. The inner and outer pin surfaces 50, 52, 58, and 62 of the aft and forward termination members 46 and 48 are curved and, but the ribbon strength member 26 is always presented with a smooth, large diameter curved surface. This maximizes the strength and life of the strength member 26. Even when the strength member 26 is wound around the spool of the winch 13, it is not damaged despite the fact that two electromechanical couplings 22 joining array modules 16, 17 do not conform to the curved surface of the winch 13.

The termination member for a Kevlar aramid fiber material ribbon strength member is particularly useful in a sonar towed array assembly. The strength member is self-adjusting when used with the termination member of the present invention, and the strength member is not subjected to damaging conditions which shorten its life.

Although only a single embodiment of the invention has been shown and described, it is to be clearly understood that the above described embodiment is merely illustrative of the principles of the present invention. Clearly, numerous and varied other arrangements can be readily devised in accordance with these principles by those skilled in the art without departing from the spirit and scope of the invention.

What is claimed is:

1. A strength member arrangement for a towed sonar array comprising:
   an elongated flexible strength member extending within and along the length of a sonar array module for carrying the tensile load of said module from one end thereof to the other, the ends of said elongated flexible strength member being joined together to form one continuous loop comprising a first end disposed towards one end of said module, and a second end disposed towards said other end of the module, ; and
   rigid termination members coupled to each end of said loop.

2. The strength member arrangement of claim 1 in which the ends of said elongated flexible strength member are joined together by splicing.

3. The strength member arrangement of claim 2 in which said flexible strength member is looped around smooth, large diameter pin-surfaces provided in said rigid terminations.

4. The strength member arrangement of claim 3 in which said flexible strength member forms a double loop passing through inner and outer pin-surfaces provided in said rigid terminations.

5. The strength member arrangement of claim 4 in which said flexible strength member forms a double loop defining four flat ribbon legs, and means provided to space said legs apart and in an orthogonal relationship to each other.

6. The strength member arrangement of claim 5 in which said elongated flexible strength member is made of a synthetic aramid fiber.

7. The strength member arrangement of claim 6 in which said rigid termination is made of titanium.

8. A termination member to receive a ribbon in tension and transfer the tension load on the ribbon to the strength member, said strength member comprising;
   tensile connection means on said body for connecting said body to provide tensile stress on said body;
   first and second side legs on said body, said side legs being spaced from each other, the outer surface of said said body and the outer surface of said side legs being shaped to fit within a cylindrically tubular opening;
   first and second cross pins extending between said side legs, first and second cross pins having both having curved surfaces thereon facing said tension means on said body, at least a portion of said curved surfaces on first and second cross pins each being curved about a separate axis, said axis substantially lying in the same plane, said first pin being closer to said tension means and having a curved surface thereon which extends around said axis substantially 180 degrees and said second pin having a curved surface thereon about said axis which extends for more than 180 degrees so that when a tension ribbon is engaged upon said first and second pins, the ribbon on said second pin engages the same radius even when it is not pulling directly in alignment.

9. The member of claim 8 wherein the outer surface of said body and said outer surface of said legs are concentric about a body axis and said body axis lies in said plane.

10. The member of claim 9 wherein said curved surface of second pin on the side of said axis of curvature of said second pin away from said tension means extends outward beyond the inner surface of said legs so that said curved surface lies on the ends of said legs.

11. The member of claim 8 wherein said curved surface of second pin on the side of said axis of curvature of said second pin away from said tension means extends outward beyond the inner surface of said legs so that said curved surface lies on the ends of said legs.

12. The member of claim 10 wherein said curved surfaces of said first and second pins are both right circular cylindrical surfaces and said surfaces have the same radi.

13. The member of claim 12 wherein said curved surfaces of said first and second pins have a diameter equal to the thickness of said legs in the diametrical direction of said first pin.

14. The member of claim 13 wherein said tension means is threaded for connection of said member to another similar member.

* * * * *

UNITED STATES PATENT AND TRADEMARK OFFICE
CERTIFICATE OF CORRECTION

PATENT NO. :   4,641,288
DATED      :   Feb. 3, 1987
INVENTOR(S):   George A. McGowan, et al.

It is certified that error appears in the above-identified patent and that said Letters Patent is hereby corrected as shown below:

In the drawings:

FIG. 8, interchange numerals "50" and "58"; and

FIG. 9, interchange numerals "50" and "58".

Signed and Sealed this

Fifteenth Day of November, 1988

Attest:

DONALD J. QUIGG

*Attesting Officer*      *Commissioner of Patents and Trademarks*